(12) United States Patent
Border et al.

(10) Patent No.: US 6,787,072 B2
(45) Date of Patent: Sep. 7, 2004

(54) APPARATUS AND METHOD FOR MAKING A DOUBLE-SIDED MICROLENS MOLD AND MICROLENS ARRAY MOLD

(75) Inventors: John Border, Walworth, NY (US); Robert Dambrauskas, Pittsford, NY (US); Craig A. Sadlik, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/368,872

(22) Filed: Feb. 19, 2003

(65) Prior Publication Data

US 2003/0127759 A1 Jul. 10, 2003

Related U.S. Application Data

(62) Division of application No. 09/702,496, filed on Oct. 31, 2000.

(51) Int. Cl.[7] ............................................... B29D 11/00
(52) U.S. Cl. .......................... 264/2.5; 425/808; 264/219
(58) Field of Search ............................ 264/1.1, 1.7, 2.5, 264/219; 425/808; 409/131

(56) References Cited

U.S. PATENT DOCUMENTS

| | | | | |
|---|---|---|---|---|
| 4,199,313 A | * | 4/1980 | Bohnenberger | ............. 425/408 |
| 4,999,142 A | * | 3/1991 | Fukushima et al. | .......... 264/1.7 |
| 6,328,552 B1 | * | 12/2001 | Hendrickson et al. | ...... 425/188 |

\* cited by examiner

*Primary Examiner*—Mathieu D. Vargot
(74) *Attorney, Agent, or Firm*—Clyde E. Bailey, Sr.

(57) ABSTRACT

A method for making a double-sided microlens mold and microlens array mold is described which utilizes a spinning half radius diamond cutting member operated in a plunge cut in a technique similar to milling to cut the optical surface into a diamond turnable material. The method can be used to make high sag lens molds with high accuracy. Microlens array molds can be made with a high degree of uniformity and a nearly 100% fill factor.

7 Claims, 7 Drawing Sheets

APPARATUS AND METHOD FOR MAKING A DOUBLE-SIDED MICROLENS MOLD AND MICROLENS ARRAY MOLD

CROSS-REFERENCE TO RELATED APPLICATIONS

This is a divisional of application Ser. No. 09/702,496, filed Oct. 31, 2000. The present application is related to U.S. application Ser. No. 09/702,952, filed Oct. 31, 2000, by John Border, et al., and entitled, "Method Of Manufacturing A Microlens Array Mold And a Microlens Array;" U.S. application Ser. No. 09/702,362, filed Oct. 31, 2000, by John Border, et al., and entitled, "Apparatus For Forming A Microlens Mold;" U.S. application Ser. No. 09/708,500, Oct. 31, 2000, by John Border, et al., and entitled, "Apparatus For Forming A Microlens Array Mold;" U.S. Pat. No. 6,402,996, issued Jun. 11, 2002, to by John Border, et al., and entitled, "Method Of Manufacturing A Microlens And A Microlens Array;" U.S. application Ser. No. 09/702,402, filed Oct. 31, 2000, by John Border, et al., and entitled, "Method For Making A Microlens Mold And A Microlens Mold;" and, U.S. application Ser. No. 09/702,302, filed Oct. 31, 2000, by John Border, et al., and entitled, "Double-Sided Microlens Array."

FIELD OF THE INVENTION

The invention relates generally to the field of improved microlens molds and microlens. More particularly, the invention concerns a method of making a precision mold suitable for forming high quality, micro-sized optical articles, such as a microlens or microlens array.

BACKGROUND OF THE INVENTION

Rotationally symmetric optical surfaces in molds for injection molding or compression molding are typically made either by grinding or diamond turning. While these techniques work well for larger surfaces, they are not suited for making high quality optical surfaces in small sizes or arrays. Other techniques are available for making small scale single lenses and arrays but they are limited as to fill factor, optical accuracy and/or the height or sag of the lens geometry that can be made.

Grinding relies on an orbital motion of the grinding surfaces to make a precision optical surface without scratches. However, the orbital motion and the grinding surfaces become impractical when making optical surfaces below a few millimeters in size. Grinding multiple surfaces for an array can only be done one surface at a time with multiple pieces that are then fit together.

Diamond turning can be used to make optical surfaces down to 2 millimeters in size but the setup is difficult. Precise location of multiple optical surfaces is not possible due to multiple setups. The need for multiple setups also increases the machining time for an array so that diamond turning becomes cost prohibitive.

Another technique that is suitable for making microlenses under 2 millimeters is polymer reflow. Polymer reflow is done by depositing drops of polymer onto a surface and then heating the polymer to allow it to melt and reflow into a spherical shape under the influence of surface tension effects. In order to obtain a truly spherical optical surface, reflow lenses must be separated from one another so that they contact the underlying surface in a round pattern. To maintain round pattern of each lens at the surface, the lenses must be separated from one another which substantially limits the fill factor in an array. U.S. Pat. No. 5,536,455, titled, "Method Of Manufacturing Lens Array," by Aoyama, et al., Jul. 16, 1996, describes a two step approach for making reflow lens array with a high fill factor. Using this technique, a second series of lenses is deposited in the gaps between the first set of lenses. While this technique can provide a near 100% fill factor, the second set of lenses does not have round contact with the underlying surface so that the optical surface formed is not truly spherical. Also, reflow techniques in general are limited to less than 100 microns sag due to gravity effects. Aspheric surfaces cannot be produced using polymer reflow.

Grayscale lithography is also useable for making microlenses under 2 millimeters. Grayscale lithography can be used to make nearly any shape and high fill factors can be produced in lens arrays. However, reactive ion beam etching and other etching techniques that are used in gray scale lithography are limited as to the depth that can be accurately produced with an optical surface, typically the sag is limited to under 30 micron.

High sag lenses are typically associated with high magnification or high power refractive lenses that are used for imaging. High power refractive lenses have tight curvature and steep sides to maximize the included angle and associated light gathering or light spreading which implies a high sag. In the case of image forming, refractive lenses are preferred to preserve the wave front of the image. In other cases such as illumination where the wave front does not have to be preserved, Fresnel or diffractive lenses where the optical curve is cut into segmented rings, can be used to reduce the overall sag of the lens. In the case of microlenses, high power diffractive lenses are not feasible due to the steepness and narrow spacing of the ring segments at the edge that would be required to make a low sag, high power microlens.

U.S. Pat. No. 5,519,539, titled, "Microlens Array With Microlenses Having Modified Polygon Perimeters," by Hoopman et al., May 21, 1996 and U.S. Pat. No. 5,300,263, titled, "Method Of Making A Microlens Array And Mold," by Hoopman et al., Apr. 5, 1994, describe a method for making lens arrays that involves casting a polymer into a series of small receptacles so that surface tension forms the polymer surfaces into nearly spherical shapes. A correction is done on the shape of the receptacles to make the surfaces more closely spherical but this results in football-shaped intersections so that optical quality and the effective fill factor are limited.

Therefore, a need persists in the art for a method of making a precision microlens mold suitable for forming high quality, micro-sized optical articles, such as a microlens or a microlens array.

SUMMARY OF THE INVENTION

It is, therefore, an object of the invention to provide a method of making a precision mold for microsized optical articles.

Another object of the invention is to provide a method of making a precision mold that does not damage the mold surface.

Yet another object of the invention is to provide a method of making a mold that utilizes a cutting member that is not limited to depth of penetration.

Still another object of the invention is to provide a method of making a precision mold that is useable for forming an array of micro-sized optical articles.

It is a feature of the invention that a forming element having a high speed, rotatable half-radius diamond cutting member rotatably engages a substrate in a predetermined cutting pattern to form a precision mold surface in the substrate.

According to one aspect of the present invention an apparatus for manufacturing a double-sided microlens, comprises:

a first mold base and a second mold base, said first mold base having a first alignment member for cooperating with correspondingly aligned second alignment member in said second mold base, and wherein each of said first and said second mold base has a first and second flexible insert, respectively, for accommodating a pair of juxtaposed mold cavities for receiving a microlens mold in a fixed relationship, and a set of alignment features for aligning said first flexible insert with said second flexible insert; and, a molding assemblage having a first platen and an opposing second platen, said first platen supporting said first mold base and said second platen supporting said second mold base for molding a double-sided microlens in said microlens molds.

In another aspect of the invention, a method of making a double-sided microlens, comprising the steps of:

providing a first mold base and a second mold base each having a corresponding alignment feature and a corresponding insert flexibly mounted in said first mold base and said second mold base, said corresponding insert having a corresponding mold cavity and a pair of alignment features;

providing corresponding pairs of microlens molds configured for fixed arrangement into said corresponding mold cavity, said corresponding mold cavity being formed in a generally polygonal substrate;

arranging each one of said corresponding pairs of microlens molds into one of said corresponding mold cavity;

supportedly arranging said first mold base and said second mold base on a first platen and an opposed second platen, respectively, of a molding apparatus;

press closing said first platen upon said opposed second platen of said molding apparatus such that said microlens molds are aligned in said first mold base and said second mold base; and, introducing a molten plastic into said corresponding mold cavity;

solidifying said molten plastic in said corresponding mold cavity to form a double-sided microlens.

In another aspect of the invention, a microlens and a microlens array made by the method of the invention has a spherical shaped surface, an aspheric shaped surface or an anamorphic shaped surface.

The present invention has the following advantages: the precision microlens mold can be used to mold high quality, micro-sized optical articles, such as microlenses, that have symmetric surfaces with steep sides and high sags; and, the forming element is contoured to produce very accurate optical surfaces in single microlenses or arrays. In the case of arrays, near 100% fill factor can be achieved in the molded article.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
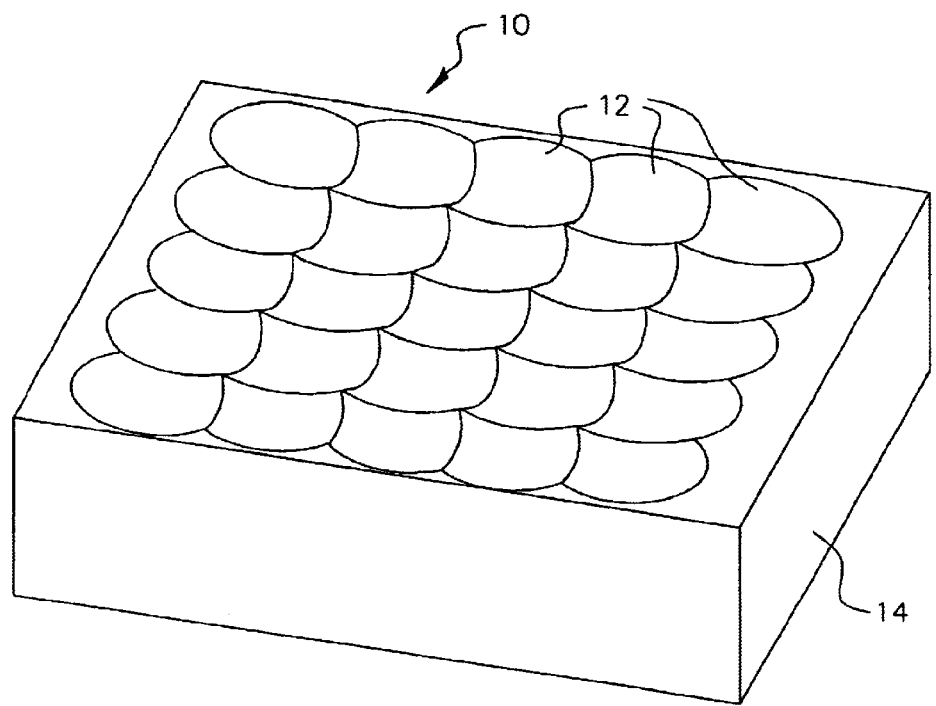
FIG. 1 is a perspective view of the substrate of the invention having a plurality of square microlens mold cavities.
Figure 2:
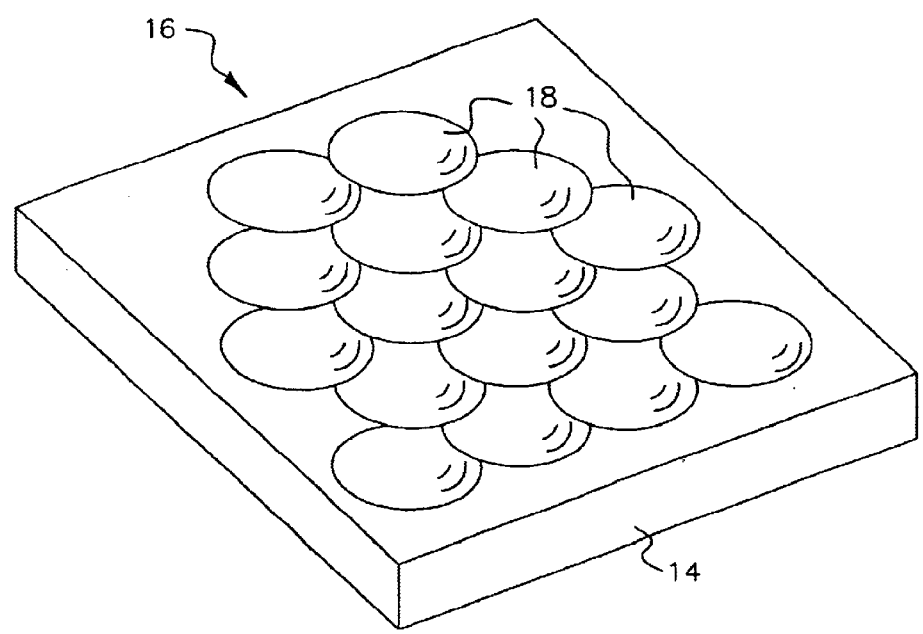
FIG. 2 is a perspective view of the substrate having a plurality of hexagonal mold cavities formed by the method of the invention.
Figure 3:
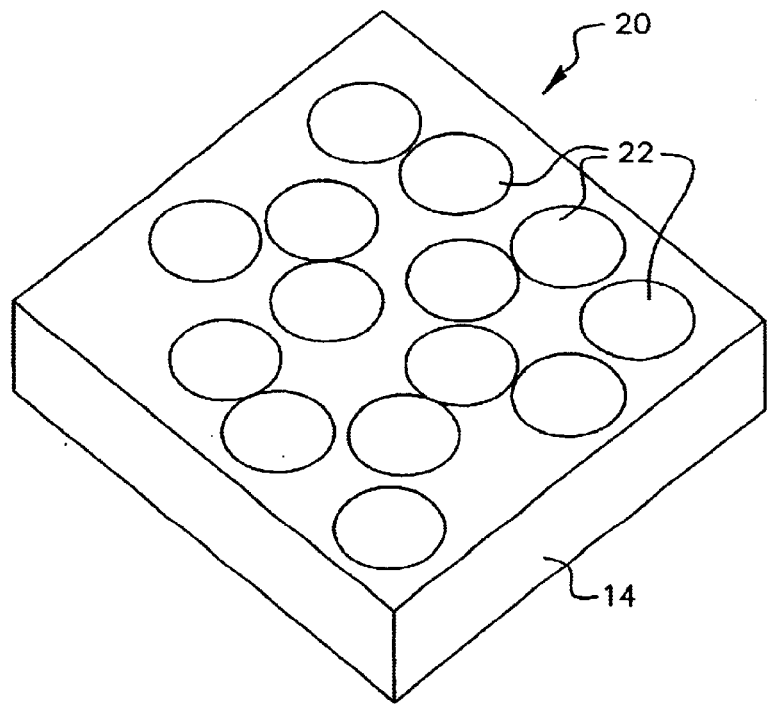
FIG. 3 is a perspective view of the substrate having a plurality of random mold cavities formed by the method of the invention.

Turning now to the drawings, and in particular to FIGS. 1–3, improved microlens molds 10, 16, 20 made by the method of the invention are illustrated. According to FIG. 1, microlens mold 10 has a plurality of interconnecting square intersection micro-sized mold cavities 12 formed in substrate 14, as described more fully below. In FIG. 2, microlens mold 16 has a plurality of interconnecting hexagonal shaped intersection micro-sized mold cavities 18 formed in substrate 14, also described more fully below. Alternatively, according to FIG. 3, microlens mold 20 has either a single micro-sized mold cavity (not shown) or a plurality of randomly distributed micro-sized mold cavities 22 formed in substrate 14, as described below. Substrate 14, in which the precision microlens molds 10, 16, 20 of the invention are formed, may be made of any material that is compatible with very hard cutting tools, such as a diamond milling tool. In the preferred embodiment of the invention, substrate 14 includes materials selected from among copper, nickel, nickel alloy, nickel plating, brass, and silicon, with hardened nickel plating being most preferred.

Figure 4:
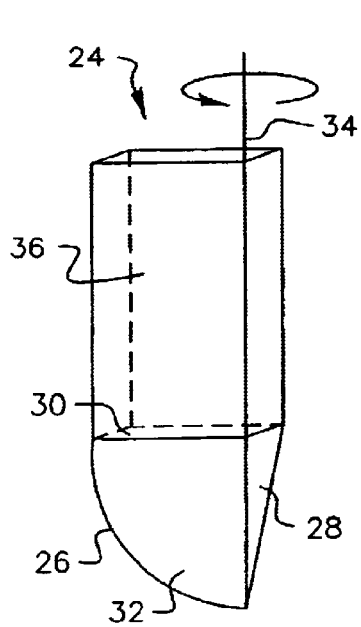
FIG. 4 is a perspective view of an upright spherical cutting member for forming a precision microlens mold.
Figure 5:
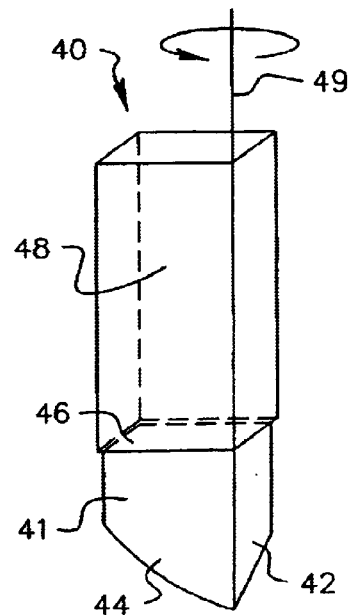
FIG. 5 is a perspective view of an aspheric cutting member of the invention.

Referring to FIGS. 4 and 5, microlens mold 10, 16, 20 have been developed using the novel diamond milling method of the invention. As shown in FIG. 4, a spherical forming element 24 having a half radius diamond cutting member 26 is used to form the mold cavities 12, 18, 22 in the respective substrate 14 of microlens mold 10, 16, 20, by diamond milling into substrate 14. Diamond cutting member 26 has a substantially planar first face 28, a substantially planar second face 30 orthogonal to and intersecting first face 28, and a spherical contoured shaped cutting face 32 intersecting both the first and second face 28, 30 (respectively). First face 28 defines the rotational axis 34 of diamond cutting member 26 when operably connected to control member 36 and affixed for milling substrate 14, described below. Forming element 24 may be used to form a spherical microlens mold 10, 16 or 20 in substrate 14 (FIGS. 1–3). Spherical microlens mold 10, 16 or 20 is used for making spherical microlens articles.

According to FIG. 5, an alternative aspheric forming element 40 has an aspheric diamond cutting member 41.

Diamond cutting member 41 has a substantially planar first face 42, a substantially planar second face 46 orthogonal and intersecting first face 42 and an aspheric cutting face 44 adjoining both first and second face 42, 46 (respectively). First face 42 defines the rotational axis 49 of diamond cutting member 41 when operably connected to control member 48 and affixed for milling substrate 14, described below. Forming element 40 having control member 48 may be used to form an aspheric microlens mold 10, 16 or 20 in substrate 14 (FIGS. 1–3). Aspheric microlens mold 10, 16 or 20 is used for making aspheric microlens articles.

Figure 6:
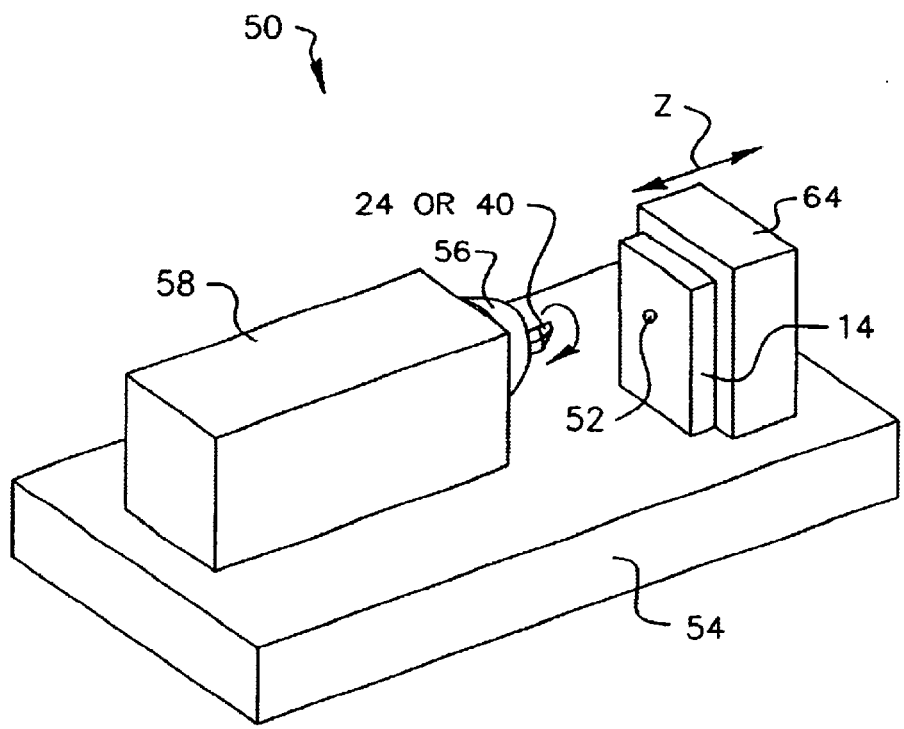
FIG. 6 is a perspective view of the apparatus of the invention for forming a single microlens mold.

Referring to FIG. 6, in another aspect of the invention, apparatus 50 for forming a precision single microlens mold (of the type shown in FIGS. 1–3) for a micro-sized optical article includes a forming element 24 or 40 operably connected to tool holder 56 and rotating control member 58. Forming element 24 or 40 has a rotatable hardened cutting member 26 or 41, preferably diamond (shown clearly in FIGS. 4 and 5), fixedly aligned relative to a linearly displaceable (noted by arrow Z) substrate 14. Substrate 14, operably connected to control member 64, is arranged for movement towards and away from hardened cutting member 26 or 41, as described above. Control member 36 or 48, forming element 24 or 40, and control member 64 are preferably all parts of a precision air bearing lathe such as is available from Precitech, Inc., located in Keene, N.H., which is expressly designed for diamond turning of high precision parts. In this embodiment, apparatus 50 can mill a predetermined shaped single microlens mold 52 in the substrate 14. Platform 54 is used to provide a solid, non-vibrating base for supporting apparatus 50 with both forming element 24 or 40 and substrate 14 during the mold forming process.

Figure 7:
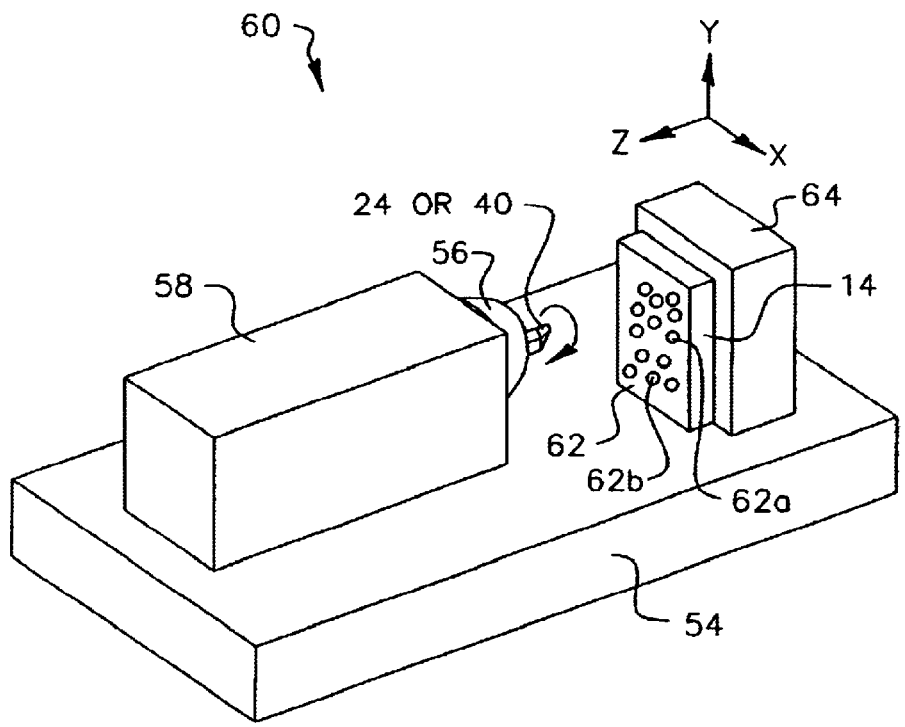
FIG. 7 is a perspective view of the apparatus of the invention for forming a microlens array mold.

Referring to FIGS. 6 and 7, substrate 14 is preferably mounted for movement relative to fixed forming element 24 or 40. According to FIG. 6, apparatus 50 forms a single microlens mold 52 in substrate 14, as discussed above. In FIG. 7, however, apparatus 60 has a substrate 14 mounted for three-dimensional movement for forming a microlens mold array 62. Flexibly moveable substrate 14 is operably connected to control member 64 that governs the movements of substrate 14. The control member 64 in this case preferably has the ability of precision controlled movement of substrate 14 in the directions X-Y-Z as indicated in FIG. 7. Precision air bearing lathes with precision X-Y-Z table movement are available from Precitech, Inc., located in Keene, N.H. The X-Y-Z table movement of control member 64 is used to produce the flexible movements of substrate 14 relative to forming element 24 or 40. A tool holder 56 fixedly attached to rotating control member 58, such as the ones described above, having diamond cutting member 26 or 41 (as described above) is positioned for milling microlens array mold 62 in substrate 14. By having a movable substrate 14, an array of microlens mold cavities can be formed in substrate 14. Movable substrate 14 is first positioned to mill one of a plurality of microlens mold cavities 62a in the microlens array mold 62. After forming the one of a plurality of microlens mold cavities 62a, forming element 24 or 40 is removed from the mold cavity 62a and then the substrate 14 is moved laterally (X-Y) by control member 64 to another position for forming another microlens mold cavity 62b. This procedure is repeated until the desired number of microlens mold cavities in the microlens array mold 62 is formed in substrate 14. Thus, by repeating these steps, apparatus 60 having a movable substrate 14 can produce a high quality microlens array mold 62, such as those illustrated in FIGS. 1–3.

Those skilled in the art will appreciate that any rotationally symmetric optical surface, such as a microlens surface, can be produced in the manner described. Spherical surfaces are produced using a half radius diamond with a circular segment diamond. Aspheres can be produced by using a diamond with an aspheric cutting edge.

Moreover, some rotationally non-symmetric lens surfaces, such as anamorphic surfaces, can be made using a modified version of the technique described. In this case, the diamond tooling is moved laterally during the cutting action to create an elongated version of the spherical or aspheric surface.

Figure 8:
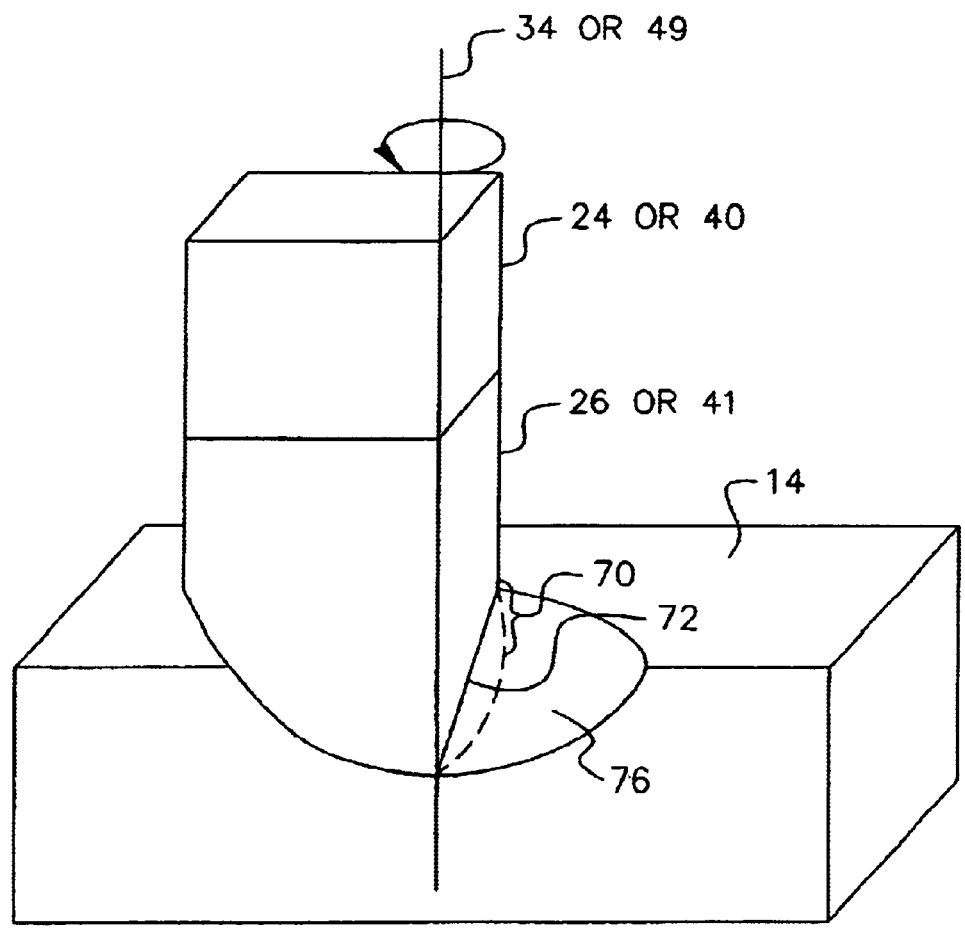
FIG. 8 is an enlarged perspective view of the forming element of the invention showing a clearance in mold cavity.

Skilled artisans will appreciate that in order to obtain a high quality lens surface, it is important to follow some basic machining concepts. To minimize the center defect in the lens surface produced, it is important to center the diamond cutting member 26 or 41, as shown in FIGS. 4 and 5. The quality of microlens mold 10, 16, 20 is best achieved if the axis of rotation 34 or 49 of diamond cutting member 26 or 41 (respectively) is centered to better than 5 microns relative to the axis of rotation (not shown) of the tool holder 56 in rotating control member 58 (FIGS. 6 and 7). Also, the tool holder 56 must be balanced to eliminate vibration to minimize chatter. Solid platform 54 helps to promote stability of apparatus 50 and 60 during operation. Further, the right combination of diamond cutting member 26 or 41 rotational speed, feed, i.e., the rate that diamond cutting member 26 or 41 penetrates substrate 14, and lubrication must be used to obtain the cleanest cut. Moreover, according to FIG. 8, forming element 24 or 40, shown with diamond cutting member 26 or 41 (similar to those described), must be produced in such a manner that a sufficient clearance 70 is provided on the back side 72 of the diamond cutting member 26 or 41 to avoid drag marks on substrate 14. Drag marks (not shown) typically result from interference of the backside 72 of diamond cutting member 26 or 41 with the substrate 14 during the formation of microlens mold 76.

By using the method of the invention, spherical microlens molds have been made down to 30 microns in diameter with irregularity of better than 0.50 wave (0.25 micron). Further, microlens mold arrays have been made up to 80×80 microlenses with a 250 micron pitch in an orthogonal layout and a near 100% fill factor.

Moreover, it should be appreciated that the repeated milling process of the invention (FIG. 7) is well suited for making accurate microlens arrays. Since the process for making each microlens in the array is unconnected to the other lenses in the array, a nearly 100% fill factor can be obtained in the array.

Furthermore, aspheric lens surfaces can also be produced using this technique. In this case, an aspheric diamond cutting member 41 (FIG. 5) is all that is required to make rotationally symmetric aspheric lens surfaces. Anamorphic lens surfaces can be made as well using a modified version of this technique. In this case, the same or similar diamond cutting member 41 is moved laterally during the cutting operation to produce an elongated lens surface.

The precision molds 10, 16, 20 (FIGS. 1–3) made with the methods and apparatus 50 or 60 of the invention, can be used to manufacture large numbers of optical articles, such as microlenses. Generally, injection molding and compression molding are the preferred molding methods for forming the typically glass or plastic microlenses. In some cases casting is the preferred method.

Figure 9:
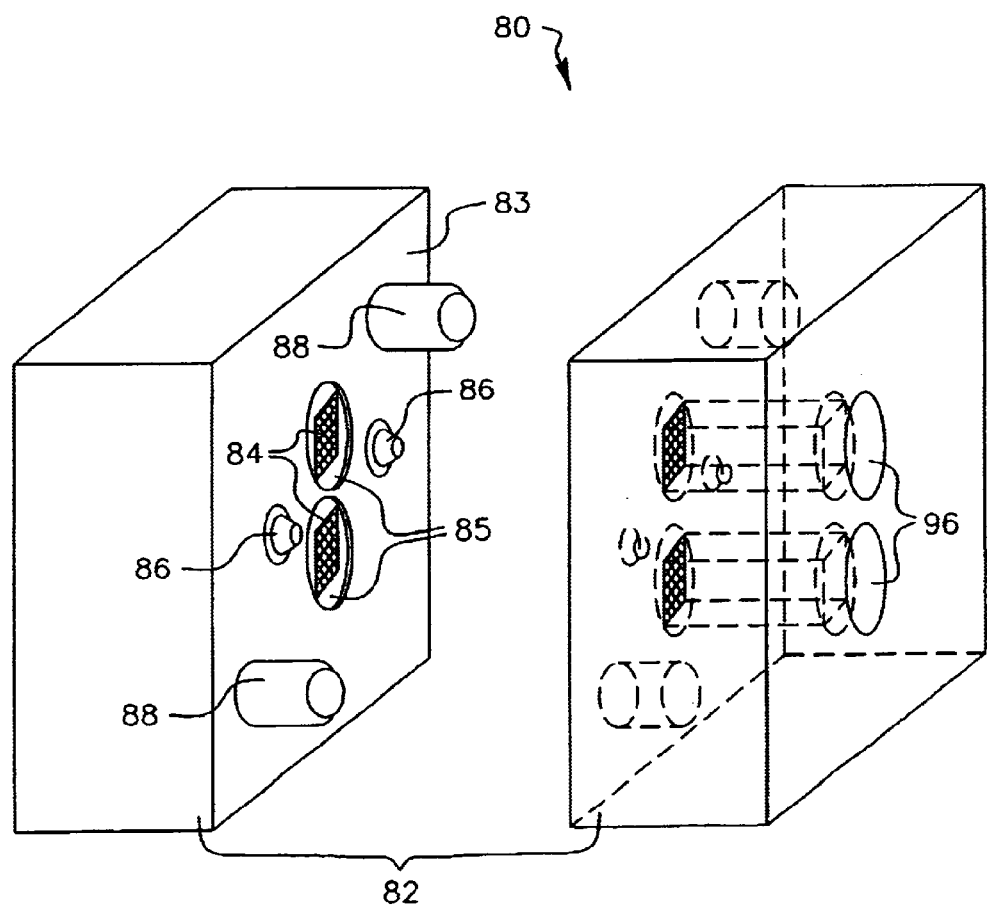
FIG. 9 is a perspective view of a two-sided microlens mold made by the method of the invention.
Figure 10:
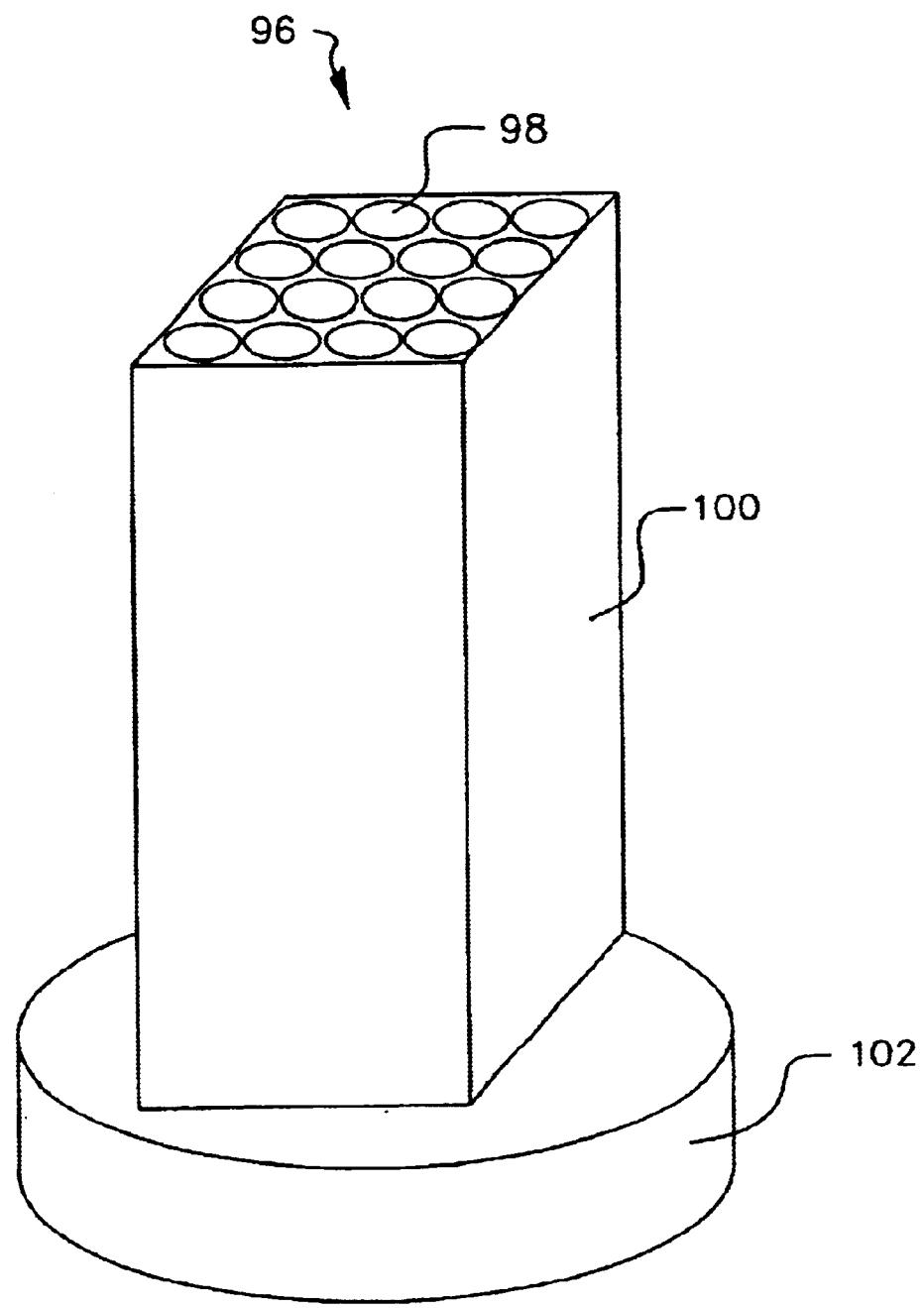
FIG. 10 is an enlarged perspective view of a microlens array mold mounted for use in a mold base for injection molding or compression molding; and, FIG. 11 is a perspective view of an apparatus for making a double-sided microlens.
Figure 11:
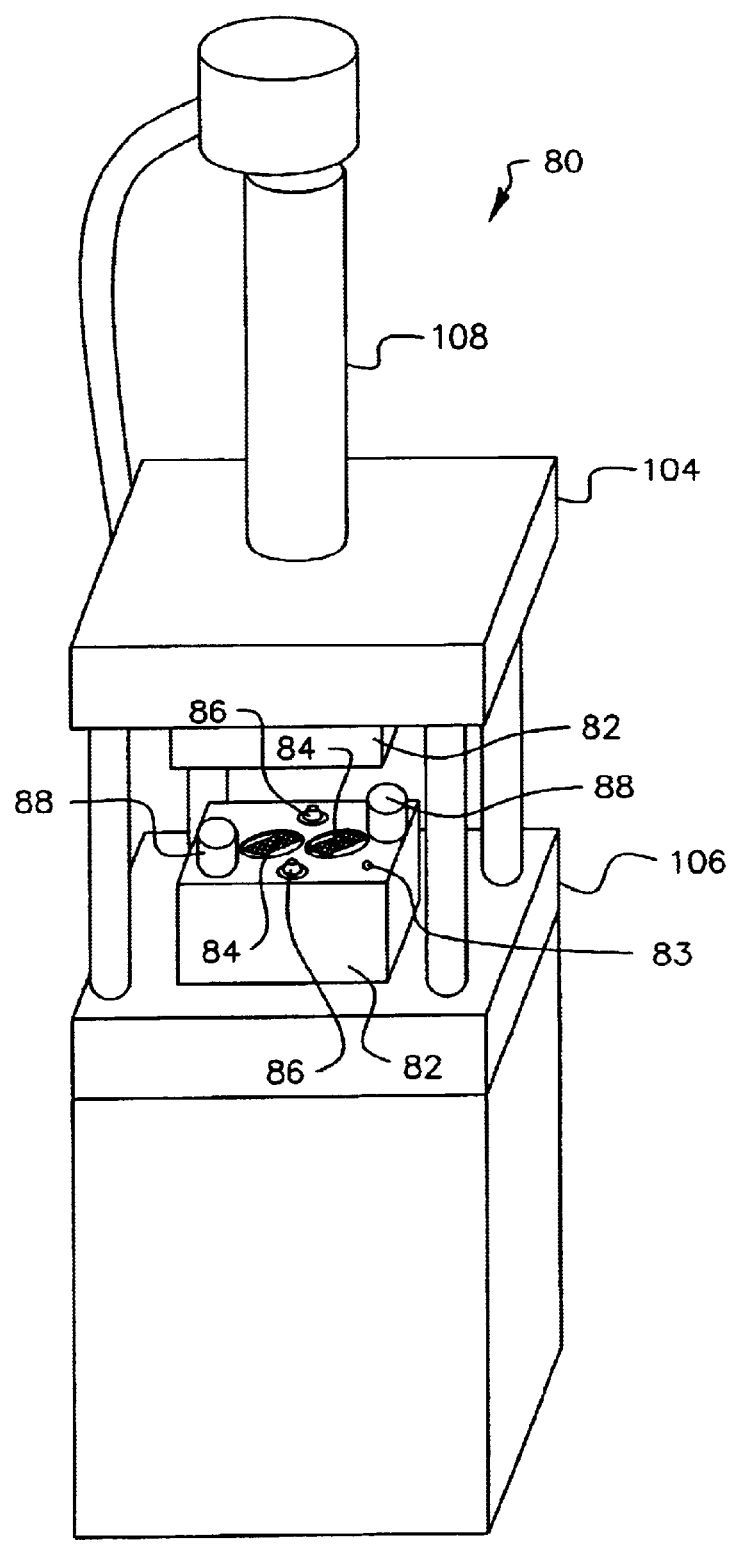

Referring to FIGS. 9 and 11, the apparatus used for injection molding or compression molding of plastic microlenses using the microlens molds mounted into a mold base is illustrated. Apparatus for molding a two-sided microlens array 80 is composed of two large blocks or mold bases 82 each having an active molding face 83. Mold bases 82 are comprised typically of steel or other metal. Alignment members arranged on molding faces 83 include guide pins 88, tapered locating bushings 86 and corresponding apertures (not shown) for receiving guide pins 88 and tapered locating bushings 86. The microlens molds 84 and the mold cavities 85 were made according to the methods and apparatus of the invention. Referring to FIG. 11, in operation, the apparatus 80 comprises mold bases 82 which are installed into one of two platens 104, 106 of a hydraulic, pneumatic or electrically driven press 108. One side of the apparatus 80 is connected to one platen 104 of the press 108 and the other side is connected to the other platen 106. When the press closes, the guide pins 88 help to align the two sides of the mold base 82. At the final closing, the tapered locating bushings 86 align the two sides of the mold base 82 and the microlens molds 84 with each other. In the case of molding a two-sided microlens array, it is very important that the microlens surfaces on the opposing sides are aligned with each other. To aid with the alignment of the opposing microlens surfaces in each of the sides of the mold base 82, the microlens molds 84 are typically made on square substrates 100 (as shown in FIG. 10) so that they cannot rotate in the mold base 82.

In the case of injection molding, after the press and mold base have been closed, molten plastic is injected under pressure into the mold cavity. After the plastic has cooled in the mold to the point that it has solidified, the press and mold base are opened and the molded microlens array is removed from the mold.

In the case of compression molding, prior to the press closing, a hot plastic preform is inserted into the heated mold cavity. The press and mold base is then closed which compresses the plastic preform and forms the plastic to the shape of the mold cavity and microlens array mold. The mold and plastic is then cooled, the press and mold base is opened and the molded microlens array is removed from the mold.

In an alternate case in which a one-sided microlens array or single microlens is being injection or compression molded, the opposing side from the microlens mold is typically a plano surface and then, since side-to-side and rotational alignment is not an issue, the microlens mold may be made onto a round substrate.

FIG. 10 shows the microlens array mold 96 (also shown in FIG. 9) with a square substrate 100 as is typically used to prevent rotation of the microlens array mold surface 98 in the mold base 82 of apparatus 80. The microlens array mold surface 98, the depth of the mold cavity 85 and the thickness of the molded microlens array article are determined precisely by adjusting the overall height of the substrate 100 and the height of the larger round substrate 102 on the bottom of the substrate 100.

In cases where casting is the preferred method of production, the material is simply poured into the mold cavity and allowed to solidify by chemical reaction rather than cooling. After the part has solidified, the part is removed from the mold.

It is our experience that microlens molds made according to the invention have been used to injection mold microlens surfaces in which the sag is not limited, as indicated below. Further, near hemispheric lenses can be produced with very steep sidewalls. Also, it is our experience that optical surfaces can be machined directly into mold materials such as nickel, copper, aluminum, brass, nickel plating, or silicon.

Since apparatus 50, 60 having a forming element 24, 40 with diamond cutting member 26, 41 (respectively) is quite accurate, it is our experience that lens surfaces can be produced in sizes down to 10 micron or less in diameter and 2 micron sag. Lenses up to 25 mm in diameter are also possible with sags of over 12.5 mm.

The following are several exemplary examples of microlenses made with the method and apparatus of the invention.

EXAMPLE 1

A microlens array mold with 80×80 microlenses was made in aluminum. The half radius diamond tool was obtained from ST&F Precision Technologies and Tools, located in Arden, N.C. The microlens surfaces were 0.250 mm across positioned in a square intersection array. The microlenses surfaces were spherical in curvature with a radius of 0.500 mm and a sag of 33 micron. Referring to FIG. 4, centering of the diamond cutting member 26 in the control member 36 was done using an iterative process where a test cut was examined under the microscope and adjustments of the location of diamond cutting member 26 were made based on the size of the center defect. Rotational speed of diamond cutting member 26 used was about 1000 rpm. Cutting fluid was purified mineral oil. The result of this process was a center defect of the machined mold of 2 micron and surface irregularity of 1 Wave (0.5 micron). Parts were subsequently injection molded, using the machined mold surface, to produce polymethylmethacrylate microlens arrays.

EXAMPLE 2

Similar to Example 1 with the exception that a hardened nickel-plated substrate was used for the machined mold surface.

EXAMPLE 3

A microlens array mold with 13×13 microlenses surfaces was made in a hardened nickel-plated substrate. The microlens surfaces were 1.30 mm across positioned in a square intersection array. The half radius diamond tool was obtained from ST&F Precision Technologies and Tools, located in Arden, N.C. The microlens surfaces were spherical in curvature with a radius of 3.20 mm and a sag of 213 micron. Centering and the machining process were the same as described in Example 1. The result was a center defect of 1.5 micron with a surface irregularity of 0.30 Wave (0.15 micron).

EXAMPLE 4

A series of single microlens surfaces was made in a 715 nickel alloy substrate. The microlens surfaces all were made with a 0.500 mm radius diamond tool. Diameters varied from 0.062 mm to 0.568 mm. The machining process was similar to that described in Example 1.

EXAMPLE 5

A larger microlens array of 63.5×88.9 mm was made with 21,760 microlenses in total in a 125×175 square intersection array. A diamond half radius tool with a 0.5008 mm radius was used, obtained from Chardon Tool, Inc., located in Chardon, Ohio. The array was made with a 0.50932 pitch and a 0.16609 sag. The substrate was nickel-plated steel. The machining process was similar to that described in Example 1.

EXAMPLE 6

It is also within the contemplation of the invention that by machining matched optical surfaces for a mold, two-sided microlens arrays can be molded in large numbers. According to FIG. 9, two matched microlens array surfaces were made in hardened nickel-plated substrates. The half radius diamond tool or diamond cutting member 26 (FIG. 4) was obtained from Contour Fine Tooling, Inc., located in Marlborough, N.H. The microlens surfaces were made with a 1.475 mm radius and a 0.750 mm pitch in a square intersection pattern, the sag was 99 micron. The machining process was similar to that described in Example 1. A center defect of 2 micron and an irregularity of 0.3 Wave (0.15 micron) were achieved in the machined surface. In this case, the two matched microlens array surfaces were mounted in a mold base so that they were opposed. To align the microlens surfaces on each side, the microlens surfaces were machined into square substrates prior to mounting into a mold base thereby inhibiting rotational misalignment. Taper lock bushings were then used to prevent lateral misalignment. Following this process, two-sided microlens arrays were injection molded from polymethylmethacrylate. The molded microlenses on the two-sided array were aligned with each other within 30 micron.

The invention has been described with reference to a preferred embodiment. However, it will be appreciated that variations and modifications can be effected by a person of ordinary skill in the art without departing from the scope of the invention.

Parts List 10 microlens mold with square intersections
12 mold cavity with square perimeter
14 substrate
16 microlens mold with hexagonal intersections
18 mold cavity with hexagonal perimeter
20 microlens mold with randomly distributed microlenses
22 randomly distributed mold cavities
24 spherical forming element
26 spherical diamond cutting member
28 first face of diamond cutting member 26
30 second face of diamond cutting member 26
32 spherical contoured cutting face of diamond cutting member 26
34 rotational axis of diamond cutting member 26
36 control member for diamond cutting member 26
40 aspheric forming element
41 aspheric diamond cutting member
42 substantially planar first face of aspheric diamond cutting member 41
44 aspheric cutting face of aspheric diamond cutting member 41
46 substantially planar second face of aspheric diamond cutting member 41
48 control member for diamond cutting member 41
49 rotational axis of diamond cutting member 41
50 apparatus for forming a precision single microlens mold
52 single microlens mold
54 platform
56 tool holder for forming element 24 or 40
58 rotating control member
60 alternative embodiment of apparatus for making microlens array molds
62 microlens array mold
62a single microlens mold cavity Parts List—Continued 62b another single microlens mold cavity
64 control member
70 clearance
72 backside of diamond cutting member
76 microlens mold apparatus
80 for molding a two-sided microlens array
82 mold base
83 active molding face
84 microlens molds
85 mold cavities
86 tapered locating bushings
88 guide pins
96 microlens array mold
98 microlens array mold surface
100 square substrate
102 round substrate
104 platen
106 platen
108 press

What is claimed is:

1. Method of making a double-sided microlens, comprising the steps of:

providing a first mold base having alignment members and a mold cavity;

providing a second mold base having alignment members and a mold cavity;

mounting a first microlens mold, formed in a substrate, in said mold cavity of said first mold base;

mounting a second microlens mold, formed in a substrate, in said mold cavity of said second mold base and adjusting said second microlens mold in said mold cavity of said second mold base;

supportedly arranging said first mold base and said second mold base on a first platen and an opposed second platen, respectively, of a molding apparatus;

press closing said first platen upon said opposed second platen of said molding apparatus and aligning said fist and second microlens molds in said first mold base and said second mold base forming a single mold cavity;

introducing a molten plastic into said single mold cavity; and solidifying said molten plastic in said single mold cavity and forming a double-sided microlens.

2. The method recited in claim 1 wherein including the step of forming each of said microlens molds in a polygonal substrate with a diamond cutting member.

3. The method recited in claim 2 wherein said generally polygonal substrate comprises materials selected from the group consisting of: hardened nickel; nickel alloy; brass; copper; aluminum, and silicon.

4. The method recited in claim 2 wherein said generally polygonal substrate is hardened nickel.

5. The method recited in claim 2 wherein said diamond cutting member has a generally spherical shape.

6. The method recited in claim 2 wherein said diamond cutting member has a generally aspherical shape.

7. The method recited in claim 2 wherein said diamond cutting member has an anamorphic shape.

* * * * *